(12) United States Patent
Oran

(10) Patent No.: US 7,580,977 B1
(45) Date of Patent: Aug. 25, 2009

(54) SYSTEM FOR USING TEXT TERMINAL FOR THE DEAF (TTD) DEVICES FOR INTERNET INSTANT MESSAGING AND CHAT SESSIONS

(75) Inventor: David R. Oran, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 750 days.

(21) Appl. No.: 10/835,762

(22) Filed: Apr. 29, 2004

(51) Int. Cl.
G06F 15/16 (2006.01)
(52) U.S. Cl. ...................................... 709/204
(58) Field of Classification Search ......... 709/204–207; 379/52
See application file for complete search history.

(56) References Cited

U.S. PATENT DOCUMENTS

| | | | | |
|---|---|---|---|---|
| 5,450,470 A | * | 9/1995 | Alheim | 379/52 |
| 5,943,395 A | * | 8/1999 | Hansen | 379/52 |
| 6,668,043 B2 | * | 12/2003 | Hyziak et al. | 379/52 |
| 6,735,286 B1 | * | 5/2004 | Hansen et al. | 379/52 |
| 6,757,732 B1 | * | 6/2004 | Sollee et al. | 709/227 |
| 6,914,964 B1 | * | 7/2005 | Levine | 379/52 |
| 7,142,642 B2 | * | 11/2006 | McClelland et al. | 379/52 |
| 7,174,004 B1 | * | 2/2007 | Michaelis | 379/52 |
| 2004/0228325 A1 | * | 11/2004 | Hepworth et al. | 370/352 |

* cited by examiner

*Primary Examiner*—Jeffrey Pwu
*Assistant Examiner*—Farhad Ali
(74) *Attorney, Agent, or Firm*—Stolowitz Ford Cowger LLP

(57) ABSTRACT

A gateway receives a call from a Text Terminal for the Deaf (TTD) device associated with an instant messaging or chat session. The gateway establishes the instant messaging or chat session on behalf of the TTD device and then converts between the TTD tones used by the TTD device and text used in the instant messaging or chat session.

34 Claims, 5 Drawing Sheets

SYSTEM FOR USING TEXT TERMINAL FOR THE DEAF (TTD) DEVICES FOR INTERNET INSTANT MESSAGING AND CHAT SESSIONS

BACKGROUND

Instant Messaging (IM) is a type of communications service that enables users to exchange text messages with other individuals or create chat rooms in order to communicate in real time over the Internet. Typically, the instant messaging system also provides a "presence" service which alerts a user whenever other identified users are online. An instant message session is then initiated with that particular individual.

In one example, a Personal Computer (PC) is used to access the IM service over the Internet. In another example, a wireless Personal Digital Assistant (PDA), Cellular Telephone, etc. accesses the IM service through a wireless gateway.

Personal Computers are very popular for instant messaging but they are rather expensive, contain complex operating system and application software, and require a modem or a network interface card for connecting through the Internet to the IM server. The PC also requires an Internet Service Provider for accessing the Internet. Personal Digital Assistants and cellular telephones are also fairly expensive to use due to the cost of wireless PDA hardware and the cost of wireless usage fees. Another disadvantage to using instant messaging on cellular telephones is the inconvenience of using the phone keypad for typing characters. Thus, there is a need for additional alternatives for providing Instant Messaging.

SUMMARY OF THE INVENTION

A gateway receives a call from a Text Terminal for the Deaf (TTD) device associated with an instant messaging or chat session. The gateway establishes the instant messaging or chat session on behalf of the TTD device and then converts between the TTD tones used by the TTD device and text used in the instant messaging or chat session.

The foregoing and other objects, features and advantages of the invention will become more readily apparent from the following detailed description of a preferred embodiment of the invention which proceeds with reference to the accompanying drawings.

DETAILED DESCRIPTION

Figure 1:
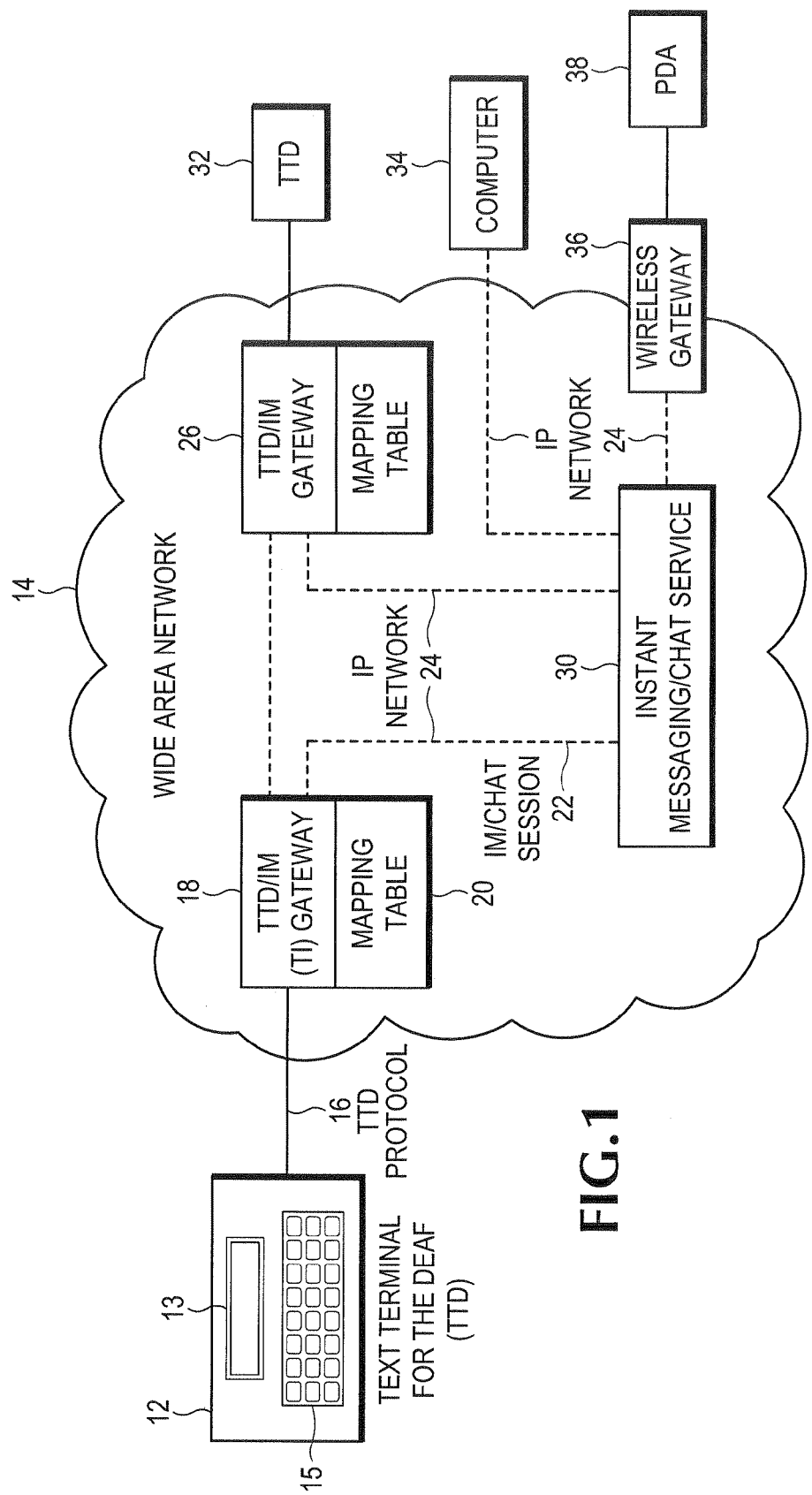
FIG. 1 is a diagram showing a TTD/Instant Messaging (TI) gateway that allows TTD devices to participate in instant messaging and chat sessions.

Referring to FIG. 1, a TTD device 12 in combination with a TTD/Instant Messaging (TI) gateway 18 provides access to an Instant Messaging (IM) or Internet Protocol (IP) chat service. For simplicity, the description below will interchangeably refer to an IM or IP chat service. It should be understood that the invention can be used for both Instant Messaging and IP chat sessions.

The TTD device 12 is a data terminal that typically is used by a person with a communication disability for communicating over a telephone. Typically TTD devices are stand-alone devices with a keyboard 15 and an electronic display 13. The TTD device 12 sends and receives analog tones which are converted to text.

The TTD device 12 is connected to the TI gateway 18 over a Plain Old Telephone Service (POTS) analog line 16. The TI gateway 18 is part of a Wide Area Network (WAN) 14 and in one embodiment also operates as a conventional TTD gateway. However, the TI gateway 18 has the novel ability to connect to an Instant Messaging (IM) or IP chat service 30.

The IM or chat service 30 in one example is provided by a server that is connected to the TI gateway 18 via an IP network 24. The IM service 30 is also accessible by any other conventional instant messaging and chat endpoint, such as a computer 34 over the IP network 24 or a wireless Personal Digital Assistant (PDA) 38 through a wireless gateway 36. The IM service 30 is also accessible by other TTD devices 32 over the same TI gateway 18 or though another TI gateway 26.

The TTD device 12 dials a destination E.164 phone number that connects to the TI gateway 18. The TI gateway 18 compares the destination phone number dialed by the TTD device 12 with phone numbers in a mapping table 20. If the destination phone number is associated with an instant messaging service in mapping table 20, the TI gateway 18 looks for additional instant messaging information in mapping table 20 needed by the TI gateway 18 to establish an IM or IP chat session on behalf of TTD device 12. For example, the TI gateway 18 may identify an IM screen name and password associated with an E.164 source phone number for TTD device 12.

The TI gateway 18 then uses the information in mapping table 20 to connect to the instant messaging or chat service 30. Different agents can reside in the TI gateway 18 for establishing IM sessions or IP chat room sessions with whatever IM or chat service is associated with the TTD device 12. For example, the TI gateway 18 can include agents that conduct IM protocols such as ICQ, America On-Line Instant Messenger (AIM), Microsoft-NBC (MSN) Messenger, Yahoo! Messenger, Simple, Jabber, etc.

After establishing the IM session 22 with IM service 30, the TI gateway 18 operates as an intermediary and conversion interface between the instant messaging or chat service 30 and the TTD device 12. For example, the TI gateway 18 may receive a request from the IM service 30 for additional information prior to establishing the IM session 22. This could include, for example, the IP addresses of the other persons to be included in the IM session.

The TI gateway 18 receives the requests from the IM service 30, converts the request text into TTD tones, and sends the TTD tones over the POTS line 16 to the TTD device 12. The TTD device 12 converts the TTD tones back into text that is displayed on the display 13. The operator of TTD device 12 responds to the request by entering the requested information via keyboard 15. The TTD device 12 converts the text into TTD tones that are then sent back to the TI gateway 18. The TI gateway 18 converts the TTD tones back into text and forwards the text response back to the IM service 30.

The TI gateway 18 performs a similar conversion between TTD tones and text messages after the IM session is established. The TI gateway 18 converts the TTD tones from TTD device 12 into text and then formats the text into IP packets for sending to the other IM session participants via the IM or chat service 30. Conversely, any IP instant messages or IP chat messages received by TI gateway 18 directed to the E.164 phone number associated with TTD device 12 are converted into TTD tones and sent over POTS line 16 to TTD device 12.

The TTD device 12 in one embodiment transmits information using a standard layer one modulation scheme, such as using a Baudot code, or some other conventional TTD protocol. Some TTD devices 12 may transmit at a faster speed using proprietary protocols or American Standard Code for Information Interchange (ASCII) code. Some TTD calls get a price break and better Quality of Service (QoS) than normal voice calls.

In direct TTD to TTD usage, these proprietary TTD protocols only have benefit if both devices have the same extension/protocol. However, when the TI gateway 18 is used as an intermediary, each end can separately benefit or mutually benefit even though they are using different protocols. In essence the TI gateway 18 acts as an intermediary, providing a gateway function among different TTD protocols.

Figure 2:
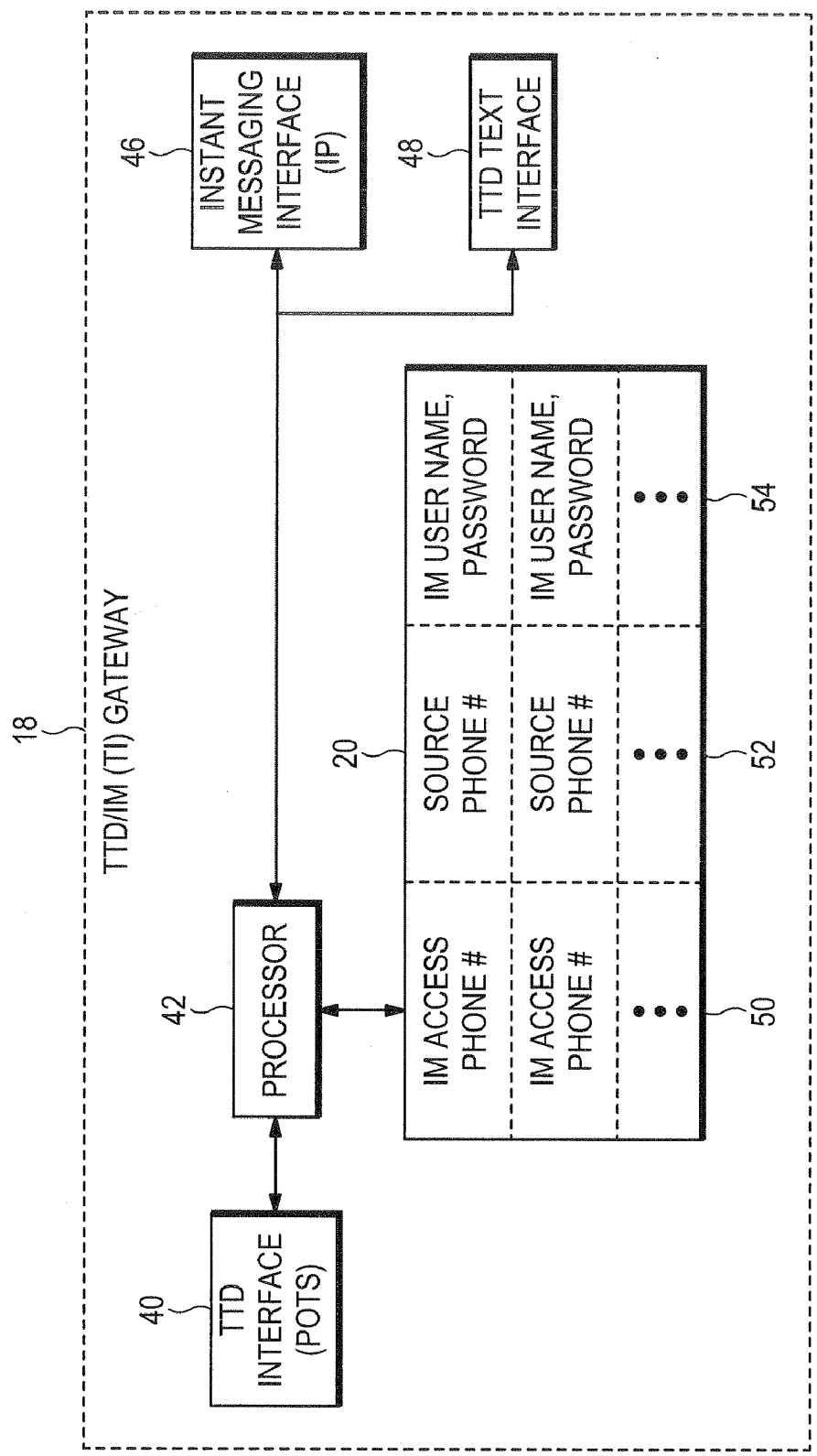
FIG. 2 is a more detailed diagram of the TI gateway.

FIG. 2 shows in more detail the functional blocks inside the TI gateway 18. A TTD interface 40 is used to connect the TI gateway 18 with the TTD device 12 (FIG. 1). The TTD interface 40 is a conventional analog telephone interface that also generates and detects TTD tones.

An instant messaging interface 46 includes the circuitry necessary for connecting to an instant messaging or chat service, such as through Internet Protocol (IP) network 24 (FIG. 1). The TI gateway 18 may also include a TTD text interface 48 for sending the text for conventional TTD transmissions to a destination TTD device. For example, this could be another POTS interface that forwards the tones to a destination TTD device. Alternatively, the TTD text interface 48 could include a modem for transferring TTD text data over a PSTN network to another TTD gateway, such as TI gateway 26 (FIG. 1), that then converts the text back into TTD tones for sending to a destination TTD device 32.

The processor 42 is used for controlling the TTD and IM operations in the TI gateway 18. The processor 42 uses the mapping table 20 to determine when a TTD call should be connected to the IM service. In one example, the processor 42 uses a protocol such as ENUM (RFC2916) to translate phone numbers into email addresses, IM screen names, Session Initiation Protocol (SIP), Addresses Of Record (AOR) or whatever other information is necessary for establishing the IM or chat session.

In one example of a mapping table 20, column 50 includes phone numbers associated with IM or IP chat services. Column 52 contains originating phone numbers associated with TTD devices calling the TI gateway 18. Column 54 contains any other IM or chat session information needed by the TI gateway 18 to establish the IM or chat session. For example, column 54 may include an IM user name, and IM password. Column 54 could also list the IP addresses or phone numbers corresponding with a buddy list or contact list for other participants of the IM or chat session.

In an alternative embodiment, the TI gateway 18 is not alternatively used as a conventional TTD gateway and is only used as a gateway to a particular IM or chat service 30 (FIG. 1). In this embodiment, it may be assumed that any call to the TI gateway 18 is for conducting an IM or chat session. In this case, the TI gateway 20 may only need to use the source phone number in column 52 for finding associated access information (screen name, password, etc.) in column 54 used for accessing the IM or chat service. As a further elaboration, the gateway may alternatively use the destination phone number, or a portion thereof, to identify the particular user of the IM system with whom the calling user wishes to establish an IM session.

In one embodiment, the information in mapping table 20 is entered from a computer terminal via the Internet. In another embodiment, the information in mapping table 20 can be entered via the TTD device by sending TTD tones to the gateway 18. For example, when the TTD device 12 initially calls the TI gateway 18, the gateway 18 may ask the TTD device if there is any configuration data that needs to be entered or modified. The TTD device 12 can then type in any necessary information required by the TI gateway 18 for establishing an instant messaging or IP chat session. Alternatively, the operator of the TTD device can phone an operator who then enters the instant messaging information into mapping table 20.

Figure 3A:
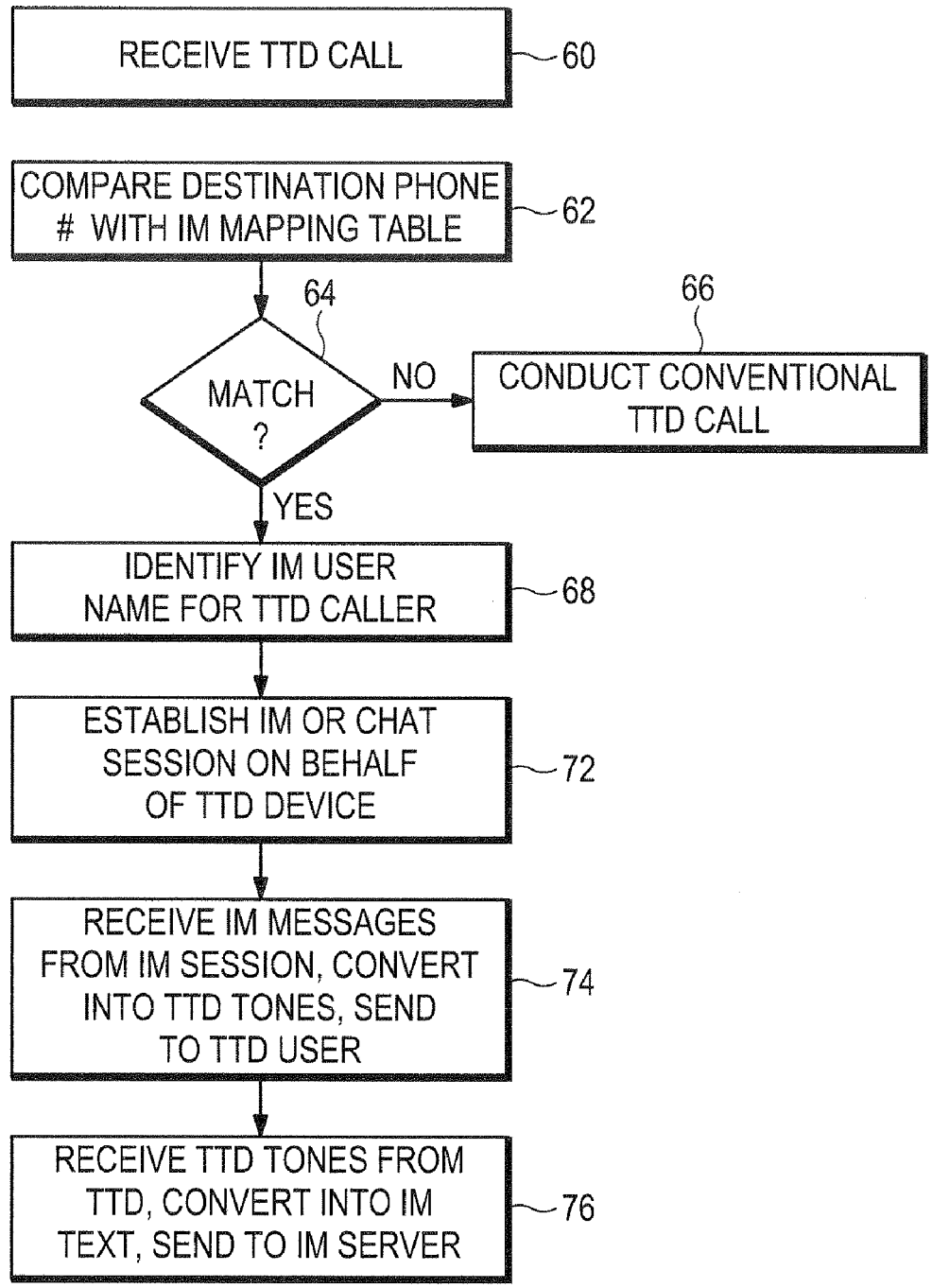
FIG. 3A is a flow diagram showing how the TI gateway operates.

FIG. 3A is a flow diagram describing one example of the operation of the TI gateway 18 described in FIGS. 1 and 2. This example, assumes that the TI gateway can be used for access to a variety of different instant messaging systems and also can operate as a conventional TTD gateway. However, the TI gateway can alternatively operate solely as a IM or chat gateway for multiple or one particular IM or chat service.

In block 60, the TI gateway receives a call from a TTD device. The E.164 destination phone number received for the call is compared with the phone numbers in column 50 of mapping table 20 (FIG. 2). If there are no matches in decision block 64, the call is determined to be a conventional TTD call and conventional TTD operations are conducted in block 66. Conventional TTD operations may include sending the TTD tones directly to another TTD device, or converting the received TTD tones into text and sending the text to a TTD operator that orally reads the text over phone lines to a destination telephone. Alternatively, if the TI gateway 18 is only used for IM or chat access, then it may not be necessary to match the destination phone number with entries in the mapping table in blocks 62 and 64.

If there is a match in decision block 64, or if the TI gateway is only used for IM or chat access, the TI gateway in block 68 identifies any instant messaging or IP chat access information needed for initiating the IM or chat session. In one example, the source telephone number for the TTD device 12 initiating the call is used as a pointer in mapping table 20 to identify the information needed for accessing the IM or chat service.

In another example, the TI gateway forwards a prompt from the IM or chat service to the TTD device asking for a screen name and password. The requested information is typed into the TTD device and transmitted to the TI gateway which then converts the TTD tones into text. The text containing the access information is then forwarded to the IM or chat service. The TI gateway completes the establishment of the IM or chat session on behalf of the TTD device in block 72.

Protocols used for establishing an IM or chat session from a computer or gateway are well known to those skilled in the art and is therefore not described in further detail. For example, any of the IM or chat agents mentioned above can be installed on the TI gateway for establishing the session.

In block 74, the TI gateway receives IM messages from other members of the IM or chat session. The text from the IM or chat messages are converted into TTD tones and sent over the POTS line 16 to the TTD device 12 (FIG. 1). In block 76, the TI gateway receives TTD tones from the TTD device 12. The TTD tones are converted to text and then sent over the IM or chat network to the other members of the session as instant messages.

Figure 3B:
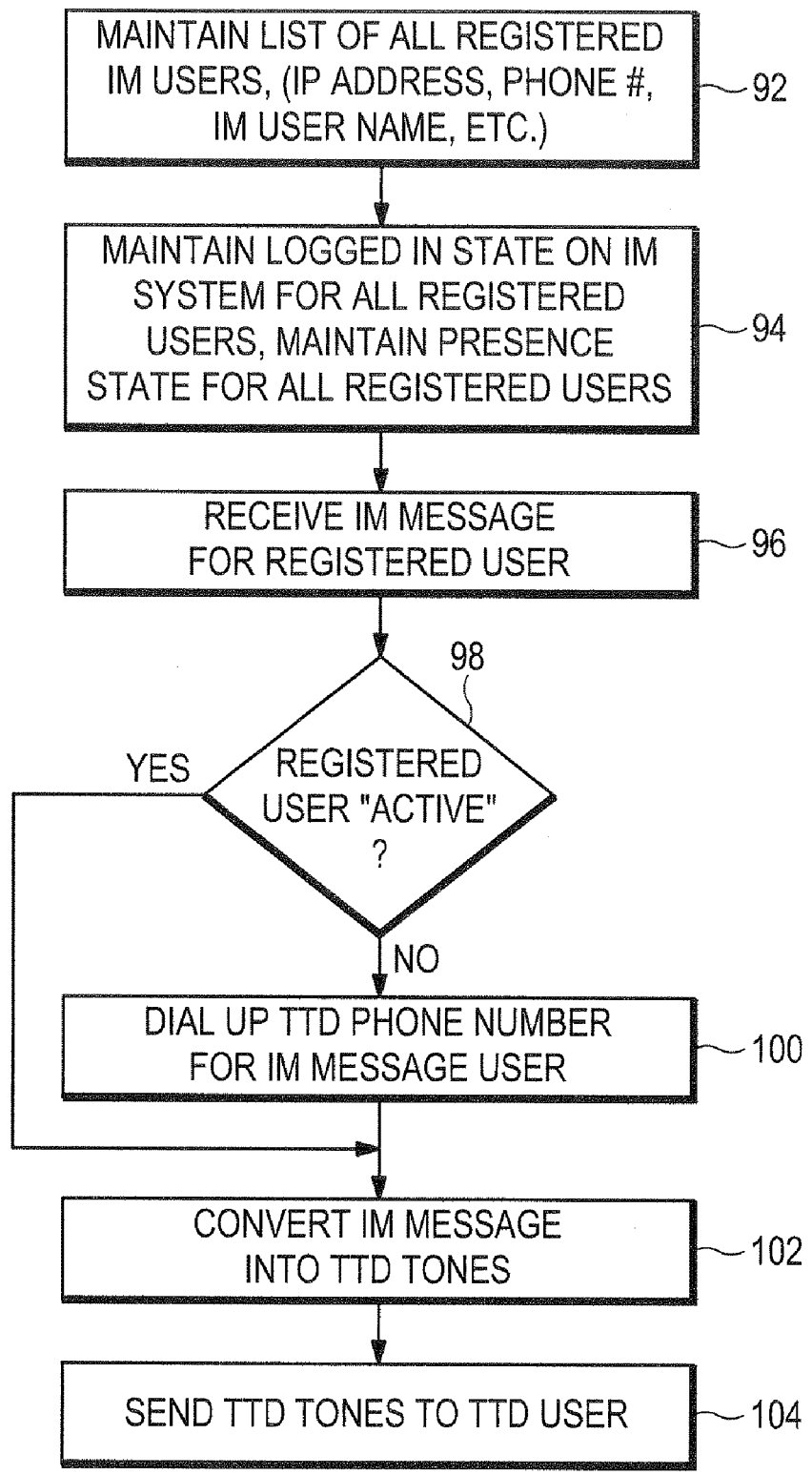
FIG. 3B is a flow diagram showing how the TI gateway dials-out for Instant Messaging users.

FIG. 3B is a flow diagram showing how the TI gateway 18 dials-out to a TTD/IM user. The TI gateway 18 (FIG. 1) automatically dials the TTD device phone number when the TTD/IM user is not currently dialed into the TI gateway 18 and hence not logged into the IM system 30.

In block 92, the TI gateway 18 maintains the mapping table 20 that lists all registered IM users. This again may include the TTD phone number, IP address, IM user name, etc. associated with each TTD/IM user. In block 94, the TI gateway 18 maintains a logged-in state on the IM system 30 for every registered user even if the TTD device associated with the registered user is not currently dialed into the gateway. The TI gateway 18 also maintains an "active" or "inactive" presence state for each registered user. The "active" state means the user's TTD device is currently connected to the TI gateway 18 and the "inactive" state means the users TTD device is not currently connected to the TI gateway 18.

The TI gateway 18 maintains a logged in state in the IM system 30 for each registered user, even for users with TTD devices that are not currently connected to the gateway. This causes the IM system 30 to treat the TI gateway as the IM endpoint for each one of the registered users and allows the TI gateway in block 96 to receive IM messages for all the registered users in block 96.

If the registered user associated with the IM message is not active (e.g, the associated is TTD terminal is not connected to the TI gateway) in block 98, the TI gateway 18 in block 100 automatically dials up the phone number in the mapping table 20 associated with the TTD/IM user. After the TTD call is established, the TI gateway 18 in block 102 converts the IM message data received from the IM system 30 into TTD tones and forwards the TTD tones to the TTD device 12 associated with the IM user name in block 104. If the registered user is currently active, then the TI gateway 18 jumps from block 98 to block 102 and does not need to first dial up the TTD phone number.

Figure 4:
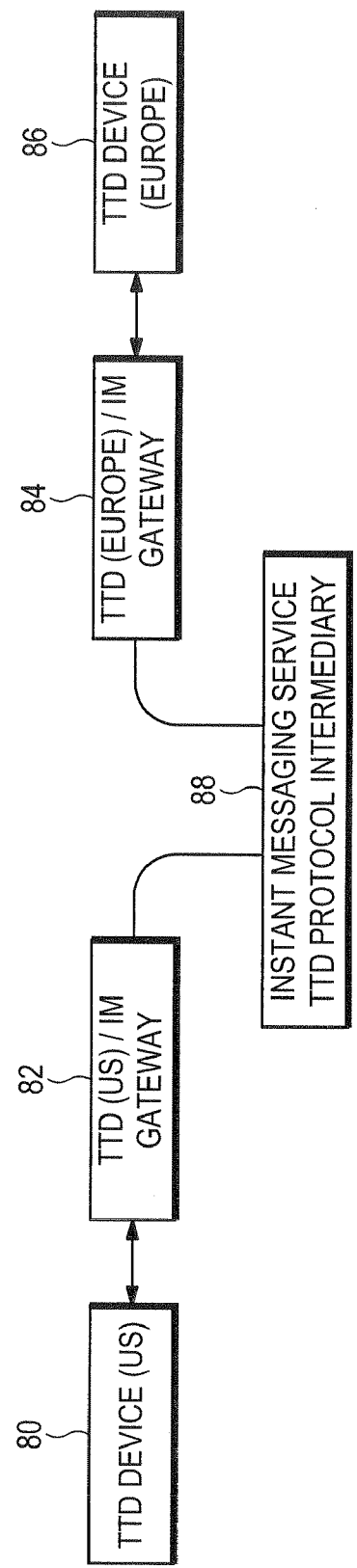
FIG. 4 is a block diagram showing how incompatible TTD devices can communicate through an IP instant messaging session.

FIG. 4 explains another aspect of the invention that allows two normally incompatible TTD devices to exchange TTD messages. In FIG. 4, a first TTD device 80 is configured for use in the United States. A second TTD device 86 is configured for use in a different country, such as some country in Europe. The TTD device 80 used in the United States might use a TTD protocol that is incompatible with the TTD protocol used in the European TTD device 86. Thus, the user of the TTD device 80 is typically unable to communicate with the user of the TTD device 86.

The present invention allows the two incompatible TTD devices 80 and 86 to communicate through the IM or IP chat service 88. The IM or chat service 88 operates as an intermediary for exchanging text between two normally incompatible devices. The TI gateway 82 communicates with TTD device 80 using the United States version of the TTD protocol. The TI gateway 82 converts the TTD tones into text that is sent to the IM or chat service 88.

Similarly, the TI gateway 84 uses the European version of the TTD signaling to receive and send TTD tones to the TTD device 86. The TI gateway 84 converts between the European TTD protocol received from the TTD device 86 and the IM text received from the IM or chat service 88. Thus, text can be exchanged between normally incompatible TTD devices 80 and 86.

In alternative embodiments of the invention, the TI gateway 18 (FIG. 1) may also add TTD acronyms to the text messages received from the IM or chat service 30 to reduce the amount of TTD signaling that has to be transmitted to the TTD device 12 or to indicate the end of a text message.

For example, the phrase "Go ahead" is often represented by TTD users by the acronym "GA". This indicates that the sending TTD user has completed their transmission and is awaiting a response. A TTD session may go as follows:

Hello, Access Board, this is Jane Smith, may I help u? GA

Dept. of Justice, Ms. Smith here. May I help u? GA.

The TI gateway 18 can automatically convert certain phrases identified in an instant message into associated TTD acronyms. For example, the word "you" is replaced by the letter "u". This reduces the amount of signaling that needs to be transmitted over the POTS line 16. The TI gateway 18 can also add the GA acronym to identify the end of a text message and indicate to the receiving TTD device that it is now clear to send a response.

Thus, the IM system described above eliminates having to use an Internet Service Provider account or having to use a complex computer operating system for text messaging.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for conducting an instant messaging or chat session, comprising:

receiving Text Terminal for the Deaf (TTD) tones over a circuit switched network from a source device at a gateway device including connecting the source device over the circuit switched network to the gateway device in automatic response to a dialing operation performed at the source device using a particular phone number selected from among a plurality of access phone numbers available for the gateway device, wherein the gateway is an Internet Protocol (IP) gateway configured to convert signaling from the circuit switched network into IP packets for transporting over an IP network;

identifying if the TTD tones are associated with a particular instant messaging or chat service automatically from the particular phone number, wherein the instant messaging or chat service is located and operates on an instant messaging or chat server that operates independently and remotely from the gateway device, and wherein the gateway establishes an IP connection with the instant messaging or chat server separately from a connection established with the source device, and the instant messaging or chat server establishes another IP connection with a destination device separately from the connection established between the source device and the gateway and separately from the IP connection established between the gateway and the instant messaging or chat server; and conducting an instant messaging or chat session with the destination device through the instant messaging or chat server using text information contained in the TTD tones including automatically establishing the instant messaging or chat session with the instant messaging or chat server over the IP network connection in automatic response to the dialing operation and converting the text information in the TTD tones into Internet Protocol (IP) packets adapted to be transported over the IP network to the instant message or chat server, wherein the IP packets are further adapted to be forwarded by the instant messaging or chat server over the IP network to the destination device.

2. The method according to claim 1 including:
identifying in a second dialing operation a second phone number of the gateway device selectively associated with the TTD tones; and
automatically establishing the instant messaging or chat session with a second instant messaging or chat service on a second instant messaging or chat server in the IP network when the second phone number is used in the second dialing operation to automatically connect to the gateway device and then to automatically connect the gateway device to the second instant messaging or chat server.

3. The method according to claim 2 including:
storing a mapping table that associates user name and password information with source phone numbers; and
using the user name and password information for the source phone number that is sending the TTD tone to automatically establish the instant messaging or chat session with the instant messaging or chat server.

4. The method according to claim 1 including:
receiving text messages from another user of the particular instant messaging or chat session over an Internet Protocol (IP) connection;
converting the text messages into TTD tones using the gateway device; and
sending the TTD tones over an analog telephone connection to a TTD terminal representing the source device.

5. The method according to claim 1, including:
maintaining a list of registered users in the gateway;
maintaining a constant logged in active state for the registered users between the gateway device and the instant messaging or chat server over the IP network for the registered users that are not currently dialed into the gateway device, the constant logged in active state configured to cause the instant messaging or chat server to treat the gateway device as an instant messaging or chat endpoint for each one of the registered users and allow the gateway to receive messages for all of the registered users;
receiving the text messages for the registered users at the gateway device from the particular instant messaging or chat service;
automatically dialing up and connecting to TTD terminals for the registered users receiving text messages using the gateway device; and
sending the TTD tones associated with the text messages from the gateway device to the dialed TTD terminals.

6. The method according to claim 1 including:
receiving the TTD tones using a TTD protocol;
converting the TTD tones into text; and
using an instant messaging or chat protocol to send the text to a plurality of participants of the instant messaging or chat session.

7. The method according to claim 1 including:
receiving the TTD tones from the source device, wherein the source device is a first TTD terminal that uses a first TTD protocol to send and receive analog TTD tones over a first analog telephone connection and convert the analog TTD tones received over the first analog telephone connection into corresponding text; and
exchanging text messages through the particular instant messaging or chat service with the destination device, wherein the destination device is a second TTD terminal that uses the same or a different TTD protocol to send and receive analog TTD tones over a second analog telephone connection and convert the analog TTD tones received over the second analog telephone connection into corresponding text.

8. The method according to claim 1 including converting the TTD tones into text and sending the text using the gateway device to a destination TTD device independently of the instant messaging or chat session when no instant messaging or chat service is associated with the TTD tones.

9. The method according to claim 1 including:
receiving text from another participant in the instant messaging or chat session;
converting phrases in the received text using the gateway device into TTD related acronyms; and
converting the TTD related acronyms into TTD tones; and
sending the TTD tones to a TTD device.

10. A gateway, comprising:
a first interface configured to receive Text Terminal for the Deaf (TTD) tones from a TTD device and connected to the TTD device over a circuit switched network in automatic response to a dialing operation performed at the TTD device using a particular phone number;
a processor configured to determine, based on the particular phone number, if the TTD tones are associated with an instant messaging or IP text messaging session request and, if so, automatically establishing the instant messaging or IP text messaging session with a particular instant messaging or chat service via an Internet connection in further automatic response to the dialing operation performed at the TTD device using the particular phone number, wherein the processor is part of an Internet Protocol (IP) gateway configured to:
operate independently and remotely from an instant messaging or chat server that operates the instant messaging or chat service and establish the Internet connection with the instant messaging or chat server separately from a connection established with the TTD device over the circuit switched network and separately from another different Internet connection established between the instant messaging or chat server and a destination device; and
a second interface configured to transmit the text, after conversion of the text from the TTD tones to Internet Protocol (IP) packets over the Internet connection established with the instant messaging or chat server operating the instant messaging or IP text messaging session.

11. The gateway according to claim 10 including a mapping table that associates different phone numbers usable in different dialing operations performed at the TTD device with received TTD tones at the first interface of the gateway and associates access information, including user sign-on information, for accessing respective instant messaging or IP text messaging services with respective ones of the different phone numbers.

12. The gateway according to claim 10 further including the processor selectively determining, based on the particular phone number, if the TTD tones are associated with a TTD device connection request and, if so, automatically establishing connection with a destination TTD device in further automatic response to the dialing operation performed at the TTD device using the particular phone number; and including a third interface used for transmitting the TTD tones or text over a wide area network to the destination TTD device independently of the particular instant messaging or IP text messaging service.

13. The gateway according to claim 10 wherein the processor operates as a proxy for a TTD device user not currently connected to the gateway in the instant messaging or IP text messaging session by receiving text messages from other participants of the instant messaging or IP text messaging session and converting the text messages into TTD tones for later sending to the TTD device user.

14. The gateway according to claim 10 wherein the processor selectively uses different agents to execute different routines for establishing automatically respective instant messaging or IP text messaging sessions with different instant messaging or chat services.

15. The gateway according to claim 10 including a mapping table for maintaining a list of registered users and the processor maintaining logged in states for the registered users between the gateway and the particular instant messaging or text messaging service even when the registered users are not currently connected to the gateway.

16. The gateway according to claim 15 wherein the processor automatically dials up a respective phone number in the mapping table for the respective registered users receiving messages from the particular instant messaging or text messaging system when the respective registered users are not currently connected to the gateway.

17. A Text Terminal for the Deaf (TTD) system, comprising:
a gateway device configured to:
receive TTD signals over a telephone line in a circuit switched network in response to a dialing operation being performed, said signals including text associated with the TTD signals to be used in an instant messaging or Internet Protocol (IP) chat session selectively and automatically connect to a particular one of a plurality of instant messaging services via an Internet connection in response to the dialing operation being performed using a selected one of a plurality of access phone numbers;
convert tones included in the TTD signals to IP packets adapted to be sent over the Internet connection to the instant messaging service to enable the text to be exchanged between a TTD device and a destination device via both the gateway device and the instant messaging service;
using the gateway device in an IP gateway that operates independently and remotely from an instant messaging or chat server that operates the instant messaging or IP chat service; and
establish the Internet connection with the instant messaging or chat server separately from a connection established with the TTD device over the circuit switched network and separately from another different Internet connection established between the instant messaging or chat server and the destination device.

18. The TTD system according to claim 17 wherein the gateway device is configured to automatically retrieve user information in response to the dialing operation being performed using the selected one of the plurality of access phone numbers and to selectively connect to the particular one of the plurality of instant messaging services using the retrieved user information.

19. The TTD system according to claim 18 wherein the gateway device includes an agent for automatically performing call establishment routines based on the retrieved user information in order to ensure selective connection of the gateway device to the particular one of the plurality of instant messaging services in response to the dialing operation being performed using the selected ones of the plurality of access phone numbers.

20. The TTD system according to claim 18 wherein the retrieved user information includes a user sign-on name and a user password.

21. A computer-readable storage medium having computer-readable instructions stored thereon, which, when executed by a computing device, configure the computing device to perform the steps of:
receiving Text Terminal for the Deaf (TTD) tones over a circuit switched network connection from a source device at a gateway device including connecting the source device to the gateway device in response to a dialing operation performed at the source device using a particular phone number selected from among a plurality of access phone numbers available for the gateway device, wherein the gateway is an Internet Protocol (IP) gateway that is connected between a circuit switched telephone network and an IP network;
identifying if the TTD tones are associated with a particular instant messaging or chat service automatically from the particular phone number used, wherein the instant messaging or chat service is located and operates in the IP network on an instant messaging or chat server that operates independently and remotely from the gateway device;
establishing an IP connection with the instant messaging or chat server over the IP network for conducting an instant messaging or chat session with a destination device via both the gateway device and the instant messaging or chat server using text information contained in the TTD tones including the gateway device establishing the session with the particular instant messaging or chat service via the IP connection in response to the dialing operation and converting the text information in the TTD tones into IP packets adapted to be sent over the IP connection to the particular instant messaging or chat server; and
establishing the IP connection with the particular instant messaging or chat server separately from the circuit switched connection with the source device and separately from another IP connection established between the instant messaging or chat server and a destination device.

22. The electronic storage medium according to claim 21 including:
identifying in a second dialing operation a second phone number of the gateway device selectively associated with the TTD tones; and
automatically establishing the instant messaging or chat session with a second instant messaging or chat server when the second phone number is used in the second dialing operation to automatically connect to the gateway device.

23. The electronic storage medium according to claim 22 including:
storing a mapping table that associates user information with source phone numbers; and
using the user information for the source phone number that is sending the TTD tone in automatically establishing the instant messaging or chat session.

24. The electronic storage medium according to claim 21 including:

receiving text messages from another user of the particular instant messaging or chat session over an Internet Protocol (IP) connection;

converting the text messages into TTD tones using the gateway device; and sending the TTD tones over an analog telephone connection to a TTD terminal representing the source device.

25. The electronic storage medium according to claim 24 including:

maintaining a list of registered users;

maintaining a logged in state for the registered users between the gateway device and the particular instant messaging or chat service independently of any current connection of a TTD terminal to the gateway device;

receiving the text messages for the registered users at the gateway device from the particular instant messaging or chat service;

automatically dialing up and connecting to TTD terminals for the registered users receiving text messages using the gateway device; and sending the TTD tones associated with the text messages from the gateway device to the dialed TTD terminals.

26. The electronic storage medium according to claim 21 including:

receiving the TTD tones using a TTD protocol;

converting the TTD tones into text; and using an instant messaging or chat protocol to send the text to a plurality of participants of the instant messaging or chat session.

27. The electronic storage medium according to claim 21 including:

receiving the TTD tones from a first TTD device that uses a first TTD protocol; and exchanging text messages through the particular instant messaging or chat service with a second TTD device that uses a second TTD protocol incompatible with the first TTD protocol.

28. A system for conducting an instant messaging or chat session, comprising:

means for receiving Text Terminal for the Deaf (TTD) tones from a source device at a gateway device including connecting the source device to the gateway device in automatic response to a dialing operation performed at the source device using a particular phone number selected from among a plurality of access phone numbers available for the gateway device, wherein the gateway device is an Internet Protocol (IP) gateway that converts signaling from a circuit switched connection in a circuit switched network into IP packets for transporting over an IP network;

means for identifying if the TTD tones are associated with a particular instant messaging or chat service from the particular phone number used, wherein the instant messaging or chat service is located and operates in the IP network on an instant messaging or chat server that operates independently and remotely from the gateway device;

means for establishing an IP connection with the instant messaging or chat server over the IP network for conducting an instant messaging or chat session with a destination device via both the gateway device and the particular instant messaging or chat service using text information contained in the TTD tones including the gateway device automatically establishing the session with the particular instant messaging or chat service via the IP connection also in response to the dialing operation and converting the text information in the TTD tones into IP packets adapted to be sent over the IP connection to the particular instant messaging or chat service operated on the instant messaging or chat server; and means for establishing the IP connection with the particular instant messaging or chat server separately from the circuit switched connection established with the source device over the circuit switched network and separately from another IP connection established between the instant messaging or chat server and a destination device.

29. The system according to claim 28 including:

means for identifying in a second dialing operation a second phone number of the gateway device selectively associated with the TTD tones; and means for automatically establishing the instant messaging or chat session with a second instant messaging or chat server when the second phone number is used in the second dialing operation to automatically connect to the gateway device.

30. The system according to claim 29 including:

means for storing a mapping table that associates user information with source phone numbers; and means for using the user information for the source phone number that is sending the TTD tone to automatically establish the instant messaging or chat session.

31. The system according to claim 28 including:

means for receiving text messages from another user of the particular instant messaging or chat session over an Internet Protocol (IP) connection;

means for converting the text messages into TTD tones using the gateway device; and means for sending the TTD tones over an analog telephone connection to a TTD terminal representing the source device.

32. The system according to claim 31 including:

means for maintaining a list of registered users;

means for maintaining a logged in state for the registered users between the gateway device and the particular instant messaging or chat service independently of any current connection of a TTD terminal to the gateway device;

means for receiving the text messages for the registered users at the gateway device from the particular instant messaging or chat service;

means for automatically dialing up and connecting to TTD terminals for the registered users receiving text messages using the gateway device; and means for sending the TTD tones associated with the text messages from the gateway device to the dialed TTD terminals.

33. The system according to claim 28 including:

means for receiving the TTD tones using a TTD protocol;

means for converting the TTD tones into text; and means for using an instant messaging or chat protocol to send the text to a plurality of participants of the instant messaging or chat session.

34. The system according to claim 28 including:

means for receiving the TTD tones from a first TTD device that uses a first TTD protocol; and means for exchanging text messages through the particular instant messaging or chat service with a second TTD device that uses a second TTD protocol incompatible with the first TTD protocol.

\* \* \* \* \*

UNITED STATES PATENT AND TRADEMARK OFFICE
CERTIFICATE OF CORRECTION

PATENT NO. : 7,580,977 B1 Page 1 of 1
APPLICATION NO. : 10/835762
DATED : August 25, 2009
INVENTOR(S) : David R. Oran It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1041 days.

Signed and Sealed this

Fourteenth Day of September, 2010

David J. Kappos
*Director of the United States Patent and Trademark Office*